US011999452B2

(12) United States Patent
Tolley

(10) Patent No.: US 11,999,452 B2
(45) Date of Patent: Jun. 4, 2024

(54) ANCHOR MONITOR

(71) Applicant: KOTO HOLDINGS LIMITED, Eden Island (SC)

(72) Inventor: Mark Tolley, Eden Island (SC)

(73) Assignee: KOTO HOLDINGS LIMITED, Eden Island (SC)

( * ) Notice: Subject to any disclaimer, the term of this patent is extended or adjusted under 35 U.S.C. 154(b) by 245 days.

(21) Appl. No.: 17/610,337

(22) PCT Filed: May 12, 2020

(86) PCT No.: PCT/IB2020/054474
§ 371 (c)(1),
(2) Date: Nov. 10, 2021

(87) PCT Pub. No.: WO2020/234692
PCT Pub. Date: Nov. 26, 2020

(65) Prior Publication Data
US 2022/0242533 A1     Aug. 4, 2022

(30) Foreign Application Priority Data
May 20, 2019   (GB) ..................... 1907111

(51) Int. Cl.
*B63B 79/10*     (2020.01)
*B63B 21/00*     (2006.01)
(Continued)

(52) U.S. Cl.
CPC .............. *B63B 79/10* (2020.01); *B63B 21/00* (2013.01); *G01C 9/02* (2013.01); *G01P 15/18* (2013.01);
(Continued)

(58) Field of Classification Search
CPC ... B63B 79/10; B63B 21/00; B63B 2021/003; B63B 2021/008; B63B 2021/009;
(Continued)

(56) References Cited

U.S. PATENT DOCUMENTS 4,651,139 A   3/1987  Oettli
4,912,464 A   3/1990  Bachman
(Continued)

FOREIGN PATENT DOCUMENTS

DE    3810084 A1   10/1989
DE    10064419 A1   7/2002
EP    2765074 A1   8/2014

OTHER PUBLICATIONS

Translation of DE10064419 (Year: 2002).*
(Continued)

*Primary Examiner* — Daniel Pihulic
(74) *Attorney, Agent, or Firm* — Cooper Legal Group LLC

(57) ABSTRACT

A device (6) for monitoring an anchor (4) for a water vessel is disclosed. The device comprises an accelerometer (32) for measuring acceleration of the device to yield acceleration data, means (38) for processing the acceleration data to yield roll angle data, means (34) for processing the acceleration data to yield velocity data, and means (52, 54) for transmitting the roll angle data and the velocity data from the device to a receiver unit (13) for use with the water vessel. This may allow the setting of the anchor and its reliability to be monitored in an efficient and cost-effective way. A corresponding receiver unit is also disclosed, along with techniques for transmitting the data through a rode.

20 Claims, 8 Drawing Sheets

(51) Int. Cl.
    *G01C 9/02*     (2006.01)
    *G01P 15/18*     (2013.01)
    *H04B 13/02*     (2006.01)

(52) U.S. Cl.
    CPC ........ *H04B 13/02* (2013.01); *B63B 2021/003* (2013.01)

(58) Field of Classification Search
    CPC . G01C 9/02; G01P 15/18; G01P 13/00; G01P 15/00; H04B 13/02; G08B 23/00; G08B 21/02
    See application file for complete search history.

(56) References Cited

U.S. PATENT DOCUMENTS

| | | |
|---|---|---|
| 2003/0128138 A1 | 7/2003 | Grunder |
| 2014/0222336 A1 | 8/2014 | Frizlen |
| 2015/0116496 A1 | 4/2015 | Ottaviano et al. |

OTHER PUBLICATIONS

Corresponding International Patent Application No. PCT/IB2020/054474, International Search Report and Written Opinion, dated Aug. 26, 2020.
Corresponding Great Britain Patent Application No. GB1907111.7, GB Search Report dated Nov. 8, 2019.

\* cited by examiner

ANCHOR MONITOR

The present invention relates to techniques for monitoring a water vessel's anchor, and in particular (but not exclusively) techniques for monitoring the reliability with which the anchor has been set, and/or for providing an indication of potential or actual anchor failure.

Reliable anchoring is an important requirement for all kinds of water vessels such as boats, ships and rafts. In calm conditions the anchor and rode are under no load and the vessel is normally safe. When wind strength, waves or currents increase, the anchoring system is placed under tension and the unknown interface between anchor and the waterbed is all that holds the vessel safely in place. However, this can also fail with no warning placing the vessel and occupants in danger. If the anchor comes loose, significant damage can result to the water vessel, other water vessels, and/or crew or passengers.

GPS-based applications have been developed which can advise a captain if the vessel has drifted outside a pre-set safe anchoring radius. However, such applications only provide an indication of a hazardous situation after the fact. Furthermore, they do not provide a means of improving and managing anchoring security.

To monitor the safe embedment of an anchor in the seabed ideally requires knowledge of how the anchor is set, and how that changes with time and conditions.

There have been several attempts to instrument an anchor and send data to the surface.

U.S. Pat. No. 4,912,464 discloses an alarm system comprising a motion sensor connected to an anchor and configured to monitor a motion signal produced by the motion sensor and raise an alarm under certain conditions, in particular when acceleration above a threshold occurs.

US 2003/0128138 A1 discloses a device that generates an alarm when a condition at an anchor or an anchor chain exceeds a set value, in particular when a jerk exceeds a predetermined measure, or when a predetermined force is exceeded.

DE 100 64 419 A1 discloses a movement or inclination monitoring device which has two or more base bodies, such as an anchor and its chain, that are directly or indirectly connected, and two or more measurement elements that are used for continuous measurement of the acceleration of one or more base bodies, measurement of angles 'alpha' of the base body axes relative to the gravitational force vector, a rotation 'beta' around a body axis, or a rate of rotation relative to 'alpha' and/or 'beta'. The measurement elements are linked by cable or in a wireless manner. If a variation in acceleration, angle, rotation angle, or rotational velocity exceeds a predetermined threshold, an alarm signal may be displayed.

DE 38 10 084 A1 discloses an alarm device which indicates the breaking loose or slippage of an anchor, the alarm having a position encoder (displacement sensor) which is connected to the anchor and rests with a wheel on the anchor (holding) ground and transmits the breaking away or slippage of the anchor to a signalling device present in the water craft by means of a pulse generator and a transmission device, such as a cable or in a wireless fashion, e.g. by ultra sound.

US 2014/0222336 A1 discloses a method for determining displacement of an anchor comprising of the steps of determining an initial position of the anchor, determining a displacement of the anchor by measuring anchor acceleration values, measuring at least one further physical quantity associated with the anchoring, and deciding whether the anchor is at rest or in motion, wherein a value of the further physical quantity is taken into account in the decision, and the acceleration values are integrated twice over time during intervals when the anchor is deemed to be in motion.

However, it has been found that the quantities measured in the known techniques do not correlate optimally with movement of an anchor, and thus may not provide a good indication of the reliability of an anchoring. For example, anchoring may remain reliable even if very high forces or jerks occur; in particular, an anchor may remain at least essentially stationary under such conditions. Thus, under such conditions, the known devices may trigger false alarms. On the other hand, if it is not known that an anchor has never made firm contact in the seabed, both boat and anchor may drift and the anchor may thus be significantly displaced, without large forces or jerks occurring on the anchor or anchor rode, or without wheels or other rotatable elements attached to the anchor being rotated. The displacement may be circular or reversing and not indicate that the anchor has never made firm contact in the seabed. Such situations may thus go undetected with the known techniques, leaving the vessel, and its occupants at risk.

Thus it has been found that, while the principle of directly measuring the anchor state is valid, the parameters that are measured by the known techniques such as displacement of the anchor do not correlate with reliability of the anchoring, and/or concern a report of anchor movement after the fact. For example, when setting the anchor, it is initially dragged an unpredictable distance along the seabed until it grips and sets. Therefore, measurement of distance does not indicate whether the anchor has set.

It would therefore be desirable to provide improved techniques for monitoring the reliability of anchoring. It would also be desirable to provide techniques which allow for determination of a reliable anchoring in the first instance, and then continual observation of the reliability of an anchoring, without the disadvantages of other methods and systems as detailed above.

According to a first aspect of the present invention there is provided a device for monitoring an anchor for anchoring a water vessel, the device comprising:
  an accelerometer for measuring acceleration of the device to yield acceleration data;
  means for processing the acceleration data to yield roll angle data, the roll angle data indicating a roll angle of the anchor;
  means for processing the acceleration data to yield velocity data; and
  means for transmitting the roll angle data and the velocity data from the device to a receiver unit for use with the water vessel.

The present invention may provide the advantage that, by using an accelerometer to produce roll angle data and velocity data and transmitting this data to the surface, it may be possible to provide sufficient information to allow the setting of the anchor and its reliability to be monitored in an efficient and cost-effective way.

The water vessel is preferably located at a water surface, while the anchor is preferably located at a water bed (for example, seabed or riverbed). The anchor is preferably connected to the water vessel by an anchor rode, which in one embodiment is a chain, although it may also be a rope, a combination of rope and chain, or any other appropriate means for connecting the anchor to the water vessel. The device is preferably connected to or otherwise associated with the anchor. For example, the device may be part of a connecting link connecting the anchor to the rode, or the device may be fixed directly to the anchor. Preferably, successive values of the roll angle data and the velocity data are transmitted continually.

The invention is based on findings in field trials performed by the applicant that, during an anchor setting procedure, anchor deceleration was greatest when the anchor was vertical or orientated within a certain range of angles from the vertical, such as plus or minus 20° or 10°; and that when the anchor starts to dig into the seabed its velocity reduces and when the dragging force of the anchor provided by a water vessel equals the resisting force of the seabed the anchor velocity becomes zero at which time the anchor has set reliably. Such findings therefore teach that an anchor can be deemed to have set reliably in a seabed if it is substantially vertical in orientation and its velocity has reduced to zero, and further that by continually monitoring anchor velocity and roll angle the reliability of an anchoring can be continually assessed in a quantitative manner.

The invention is also based on the finding that acceleration values measured by an accelerometer in a link attached to an anchor that was constrained by a clevis joint to roll with the anchor in the y-z plane but to be able to rotate freely in the x-z plane were for all practical purposes the same as the acceleration values measured by an acceleration sensor directly attached to the anchor.

It has been found that the measurements necessary to obtain the roll angle data and velocity data can conveniently be obtained from a 3-axis accelerometer. Thus, the accelerometer may be a 3-axis accelerometer arranged to produce acceleration data with three orthogonal components. The three orthogonal components may be x, y and z-components. The z-component of the acceleration data may be a component having a direction which is vertical relative to the earth's surface. The x-component may be a component having a direction which is horizontal, and substantially parallel with the direction of a rode connecting the anchor to the water vessel when the rode is in tension (or a horizontal component thereof). The y-component may be a component having a direction which is horizontal, and substantially perpendicular to the direction of the rode when the rode is in tension.

Preferably the velocity data is obtained by integrating a component of the acceleration data with respect to time. For example, the x-component of the acceleration data may be integrated once with respect to time to obtain the velocity data. This may provide a simple and convenient way of obtaining the velocity data.

In a preferred embodiment, the velocity data is obtained by integrating just the x-component of the acceleration data with respect to time. Experimentation has shown that the anchor will not normally move without force being applied by the anchor rode. Thus, in order for the anchor to move, it can be assumed that the rode is in tension, and that movement will be predominantly in the x-direction. It has therefore been found that meaningful velocity data can be obtained by integrating just the x-component of the acceleration data with respect to time, and that correction for link pitch angle may result in no significant improvement in calculation of velocity. However, if desired, one or both of the y and z-components of the acceleration data could also be used to obtain the velocity data.

Preferably, the roll angle data is obtained by comparing the acceleration data with the gravity vector. Thus, the device may further comprise means for storing a gravity vector, and the roll angle data may be produced by comparing two (or more) components of the acceleration data with the gravity vector. For example, the y and z-components of the acceleration data may be compared with the y and z-components of the gravity vector, respectively. The results of the comparison may then be used to obtain the roll angle data using the appropriate trigonometric function.

In a preferred embodiment of the invention, the device is contained within a connecting link which connects the anchor to the rode. In this case, it may be possible for the connecting link to rotate in at least one plane relative to the anchor. Experimentation has shown that, in such an arrangement, the connecting link tends to rise from its hanging position at rest as rode tension increases, approaching horizontal when sufficient tension is applied to start moving the anchor. It has therefore been found that link pitch angle may be a good early warning indicator of impending anchor movement.

Thus, the device may further comprise means for processing the acceleration data to yield pitch angle data, the pitch angle data indicating the pitch angle of the device, and the transmitting means may be arranged to transmit the pitch angle data to the receiver unit.

The pitch angle data may be obtained by comparing two (or more) components of the acceleration data with corresponding components of the gravity vector. For example, the x and z-components of the acceleration data may be compared with the x and z-components of the gravity vector, respectively. The results of the comparison may then be used to obtain the pitch angle data using the appropriate trigonometric function.

The device may further comprise means for averaging the roll angle data, the velocity data and/or the pitch angle data with respect to time. This may reduce the amount of data that needs to be transmitted. Preferably the device further comprises a memory arranged to store the average values of the roll angle data, the velocity data and/or the pitch angle data.

The device may comprise means for packaging the average values of the roll angle data, the velocity data and/or the pitch angle data into a data set, and the transmitting means may be arranged to transmit the data set from the device to the receiver unit. The data set may include an identification of the anchor. This may allow, for example, a receiver unit to distinguish between data sets transmitted by devices attached to different anchors.

In calm conditions the anchor and rode are usually under no load and the boat is safe. In this case, it may only be necessary for anchor measurement data to be made available intermittently. However, when wind strength, waves and/or current increase the anchoring system is placed under tension and there is a greater risk of the interface between the anchor and the seabed failing. In this case it may be desirable for anchor measurement data to be made available more frequently.

In a preferred embodiment of the invention, the device further comprises means for varying time intervals at which data are transmitted from the device in dependence on at least one of the velocity data and the pitch angle data. This can allow data to be transmitted more frequently when it is most needed, while avoiding unnecessary transmissions during periods of low danger.

For example, the device may comprise means for comparing the anchor velocity data to a velocity threshold value and means for decreasing the time intervals at which successive data values are transmitted if the velocity threshold is exceeded. The velocity threshold value may be, for example, substantially zero (with a margin to account for noise) so that the time intervals are decreased as soon as the anchor starts to move, although other values could be used instead.

Alternatively, or in addition, the device may comprise means for comparing the device pitch angle data to a pitch angle threshold value, and means for decreasing the time intervals at which successive data values are transmitted if the pitch angle is less than the pitch angle threshold value. The pitch angle threshold value may be, for example, 30°, 20° or 10° from horizontal, so that the time intervals are decreased as the device approaches the horizontal, although other values either greater than or less than any of these values may be used instead.

The data to be transmitted may comprise at least one of roll angle data, velocity data and pitch angle data. The data may be transmitted at, for example, 1, 2, 3 or 5 second intervals if the velocity threshold is exceeded and/or if the pitch angle is less than the pitch angle threshold value, and at 10, 20 or 30 second intervals if the velocity threshold is not exceeded and/or if the pitch angle is greater than the pitch angle threshold value. However other values either greater than or less than any of these values may be used instead.

Preferably the transmitting means comprises an acoustic transmitter. This can allow the data to be transmitted wirelessly from the device to the water surface. The acoustic transmitter may comprise, for example, means for modulating the data onto a carrier signal, and means for converting the modulated signal into an acoustic signal. The converting means may be for example an acoustic transducer such as a piezo-electric transducer.

Typically, data transmission through a body of water is achieved either by running a cable through the water, or by transmitting acoustic signals through the water. However, research carried out by the present applicant has revealed that acoustic transmission through an anchor rode (such as a chain) may provide a reliable, convenient and cost-effective way of transmitting data from an anchor to a water vessel.

When monitoring an anchor for safe holding, data is not required, or is required less frequently, when the anchor chain is slack, as holding force is practically provided by chain friction on the seabed. However, when conditions are such that the chain comes under tension, data on the status of the anchor is required. The understanding that data is mainly required when the anchor chain is in tension provided the stimulus to research and experiment with data transmission across the chain at a range of tensions. Experimentation showed that even a fairly low chain tension, in the order of tens of kilograms force, can create sufficient acoustic coupling between the links of the chain to allow effective acoustic data transmission between an anchor on the seabed and a receiver placed on the chain at the bow roller of the boat or alternatively on the bow roller of a boat to allow monitoring of the anchor state when required.

Thus, in a preferred embodiment of the present invention, the acoustic transmitter is arranged to transmit an acoustic signal through a rode, which is preferably a chain between the anchor and the water vessel. This may avoid the need to mount an acoustic transducer below the water line on the water vessel or on a separate buoy, and thus may provide a more convenient and cost-effective way of transmitting data than previously known techniques.

As an example, the acoustic transmitter may transmit an acoustic signal through the rode with a carrier frequency greater than 50 Hz, 500 Hz, 1 kHz, 2 kHz or 3 kHz and/or less than 1 MHz, 100 kHz, 40 kHz or 12 kHz, although other values greater or less than any of these values may be used instead.

In an alternative embodiment the acoustic transmitter is arranged to transmit an acoustic signal through water. In this case, the acoustic signal may be received by an acoustic transducer below the water line on the water vessel, or by a separate buoy, which may receive and demodulate the data and relay it to a device on the water vessel or elsewhere.

As discussed above, the device may be contained within a connecting link which connects the anchor to the rode. Thus, according to another aspect of the invention, there is provided a connecting link for connecting an anchor to a rode, the connecting link comprising a device in any of the forms described above. The connecting link may comprise a joint for connecting the link to the anchor, and a joint for connecting the link to a rode such as a chain.

Preferably, the connecting link is connected to the anchor by means of a joint which constrains rotation of the connecting link relative to the anchor in at least one plane. For example, the joint may constrain movement of the connecting link relative to the anchor in the y-z plane but allow rotation of the connecting link relative to the anchor in the x-z plane. This may allow the device to have a roll angle which varies with the roll angle of the anchor, and/or a pitch angle which is independent of that of the anchor and dependent upon the tension in the rode. Thus, the device roll angle may be the same as that of the anchor, while the device pitch angle may be independent of that of the anchor.

The connecting link may be arranged to accommodate the device, and/or a battery powering the device. The connecting link may comprise two or more parts which may open to reveal the device and/or battery, and which may close to seal around the device and/or battery. For example, the two or more parts may pivot with respect to each other in order to open and close around the device and/or battery. Alternatively, or in addition, the two or more parts may screw together in order to seal around the device and/or battery.

The connecting link may comprise an acoustic transducer for transmitting the roll angle data and the velocity data acoustically to the receiver unit. The acoustic transducer may be for example a piezo-electric transducer. In one embodiment, the acoustic transducer is arranged to transmit the roll angle data and the velocity data acoustically through a rode between the anchor and the water vessel. In this case, the acoustic transducer may be mechanically and acoustically coupled to the connecting link such that vibrations from the transducer are transmitted to the rode. Alternatively, or in addition, the acoustic transducer may be open to the water such that vibrations from the transducer are transmitted to the water.

A corresponding receiver unit may also be provided. Thus, according to another aspect of the invention, there is provided a receiver unit for use with a water vessel connected to an anchor, the receiver unit comprising:
  means for receiving roll angle data indicating a roll angle of the anchor, and velocity data indicating a velocity of the anchor; and
  a display for displaying the roll angle data and the velocity data.

This aspect of the invention may provide the advantage that, by receiving and displaying the roll angle data and the velocity data, the operator may be provided with the information needed to assess whether the anchor has set, the reliability of the setting, and/or whether the setting is failing or is likely to fail.

The receiver unit may further comprise means for receiving pitch angle data indicating a pitch angle of a measurement device attached to the anchor and means for providing the pitch angle data to the display.

The receiver unit may be arranged to receive data from a device and/or a connecting link in any of the forms described above. The receiver unit itself may comprise a display for displaying the roll angle data, the velocity data and/or the pitch angle data. Alternatively, or in addition, the receiver unit may relay the roll angle data, the velocity data and/or the pitch angle data to another device (such as an external portable device) which includes a display. Preferably the roll angle data, the velocity data and/or the pitch angle data are received and displayed continually.

The receiver unit may further comprise means for determining whether the anchor has set based on at least one of anchor velocity data, anchor roll angle data, and pitch angle data. For example, the determining means may determine that the anchor has been set based on one or more of the following:

The velocity data comprises a time period during which the velocity is non-zero followed by a time period in which the velocity drops to substantially zero.

The anchor roll angle has a value which is within a predetermined range of angles from the vertical (for example within 30°, 20° or 10° of vertical).

The velocity data is substantially zero and the pitch angle is within a predetermined range of angles from the horizontal (for example within 30°, 20° or 10° of horizontal).

However other values either greater than or less than any of the values given above may be used, and other factors may be used in determining whether the anchor has been set as well as or instead of those given above.

The receiver unit may comprise means for determining whether the anchor setting has failed (for example, the anchor has broken loose), and means for generating an alarm signal if it is determined that the anchor setting has failed.

The failure determining means may comprise, for example, means for comparing the anchor velocity to a predetermined velocity threshold, and means for generating the alarm signal if the threshold is exceeded. The velocity threshold may be, for example, zero velocity, or a value close to zero velocity to take into account noise and to reduce the likelihood of false alarms. Alternatively or in addition, the failure determining means may comprise means for comparing the anchor roll angle to a predetermined roll angle threshold, and means for generating the alarm signal if the threshold is exceeded. The predetermined roll angle threshold may be, for example, an angle from the vertical beyond which the alarm signal is generated. The angle may be, for example, 30°, 20° or 10° from vertical, although other values either greater than or less than any of these values may be used instead.

The receiver unit may further comprise means for sending an alarm signal to an external portable device. This can allow an operator to be informed of anchor failure or potential anchor failure as he or she moves about the water vessel, another water vessel, or the shore.

The receiver unit may also be arranged to transmit velocity data, roll angle data and/or pitch angle data to an external portable device, to allow that device to display the data.

As discussed above, it has been found that pitch angle may be a good early warning indicator of impending anchor movement. Therefore, the receiver unit may further comprise means for providing an indication of potential anchor movement based on pitch angle data. For example, the receiver unit may comprise means for comparing the pitch angle data to a pitch angle threshold, and means for generating an early warning indicator signal if the threshold is exceeded. This can allow an operator to be alerted to potential anchor movement. The pitch angle threshold may be, for example, 30°, 20° or 10° from horizontal, although other values either greater than or less than any of these values may be used instead.

Although the term "receiver unit" has been used, it will be appreciated that the various different functions described above may be provided in a single physical piece of apparatus, or may be distributed across two or more different pieces of apparatus.

As discussed above, it has been found that acoustic transmission through an anchor rode may provide a reliable, convenient and cost-effective way of transmitting data from an anchor to a water vessel. Thus, according to another aspect of the invention, there is provided receiver equipment comprising a receiver unit in any of the forms described above, and a pickup unit, the pickup unit comprising an acoustic transducer for receiving an acoustic signal transmitted through a rode between the anchor and the water vessel. Preferably the pickup unit receives the acoustic signal, converts it to an electrical signal, demodulates the signal, and transmits the demodulated signal to the receiver unit. This may avoid the need to mount an acoustic transducer below the water line of the water vessel or on a separate buoy, and thus may provide a more convenient and cost-effective way of receiving the data.

This aspect of the invention may also be provided independently. Thus, according to another aspect of the invention, there is provided a device for monitoring an anchor for anchoring a water vessel, the device comprising:

means for measuring properties relating to the orientation and/or movement of the anchor to yield measurement data; and means for transmitting the measurement data from the device to a receiver unit for use with the water vessel;

wherein the transmitting means comprises an acoustic transmitter, and the acoustic transmitter is arranged to transmit an acoustic signal through a rode between the anchor and the water vessel.

This aspect of the invention may avoid the need to mount an acoustic transducer below the water line of the water vessel or on a separate buoy, and thus may provide a more convenient and cost-effective way of transmitting data than previously known techniques. The measurement data may comprise velocity data, anchor roll angle data and/or pitch angle data.

According to another aspect of the invention there is provided a monitoring system for monitoring an anchor for anchoring a water vessel, the monitoring system comprising a device or a connecting link in any of the forms described above, and a receiver unit in any of the forms described above.

Corresponding methods may also be provided. Thus, according to another aspect of the invention there is provided a method of monitoring an anchor for anchoring a water vessel, the method comprising:

measuring acceleration of a device attached to the anchor to yield acceleration data;

processing the acceleration data to yield roll angle data, the roll angle data indicating a roll angle of the anchor;

processing the acceleration data to yield velocity data; and transmitting the roll angle data and the velocity data from the device to a receiver unit for use with the water vessel.

The method may further comprise:

receiving roll angle data indicating a roll angle of the anchor, and velocity data indicating a velocity of the anchor; and displaying the roll angle data and the velocity data on a display.

According to another aspect of the invention there is provided a method of monitoring an anchor for anchoring a water vessel, the method comprising the steps of:

measuring properties relating to the orientation and/or movement of the anchor to yield measurement data; and transmitting the measurement data to a receiver unit for use with the water vessel;

wherein the transmitting step comprises transmitting an acoustic signal through a rode between the anchor and the water vessel.

According to another aspect of the invention there is provided a method of determining a successful initial setting of a water vessel's anchor in the seabed, the method comprising the steps of continually:

a. measuring anchor acceleration in 3-axes and calculating anchor velocity and anchor roll angle from this data; and b. at all times displaying and monitoring velocity and anchor roll angle on a handheld device.

According to another aspect of the invention there is provided a method of monitoring the reliability of an anchoring of a water vessel's anchor in the seabed after it has been set, the method comprising the steps of continually:

a. measuring anchor acceleration in 3-axes and calculating anchor velocity and anchor roll angle from this data;

b. at all times displaying and monitoring velocity and anchor roll angle on a handheld device; and c. if velocity exceeds a predetermined threshold sending an alarm initiation signal to an alarm device.

According to a further aspect of the invention there is provided a system for receiving calculated velocity and roll angle and/or link pitch angle data transmitted by acoustic means across the anchor rode from a device or link attached to an anchor underwater, and for transmitting an alarm initiation signal by radio waves in the air to handheld displays and or alarm means.

Features of one aspect of the invention may be provided with any other aspect. Apparatus features may be provided with method aspects and vice versa.

Preferred embodiments of the present invention will now be described, purely by way of example, with reference to the accompanying drawings, in which.

OVERVIEW

Figure 1:
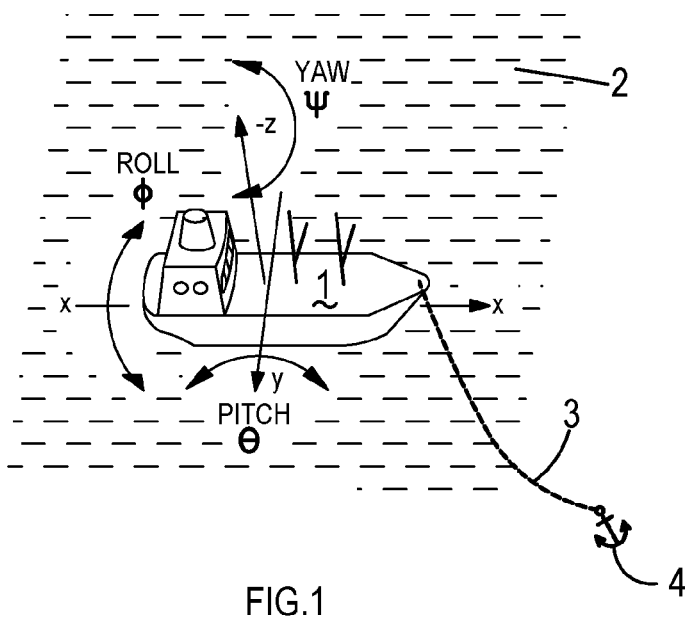
FIG. 1 shows schematically parts of a boat with a known anchoring system.

FIG. 1 shows schematically parts of a boat with a known anchoring system. Referring to FIG. 1, the boat 1 floats on the water surface 2, and is connected by means of a rode (chain) 3 to an anchor 4 in the water bed. Also shown in FIG. 1 is the relationship of the roll, pitch and yaw angles to x, y and z coordinates.

Modern stockless anchors typically comprise one or more flukes connected by a pivot to a shank. Typically, tripping palms are provided which drag on the seabed, forcing the main flukes to dig in.

Figure 2:
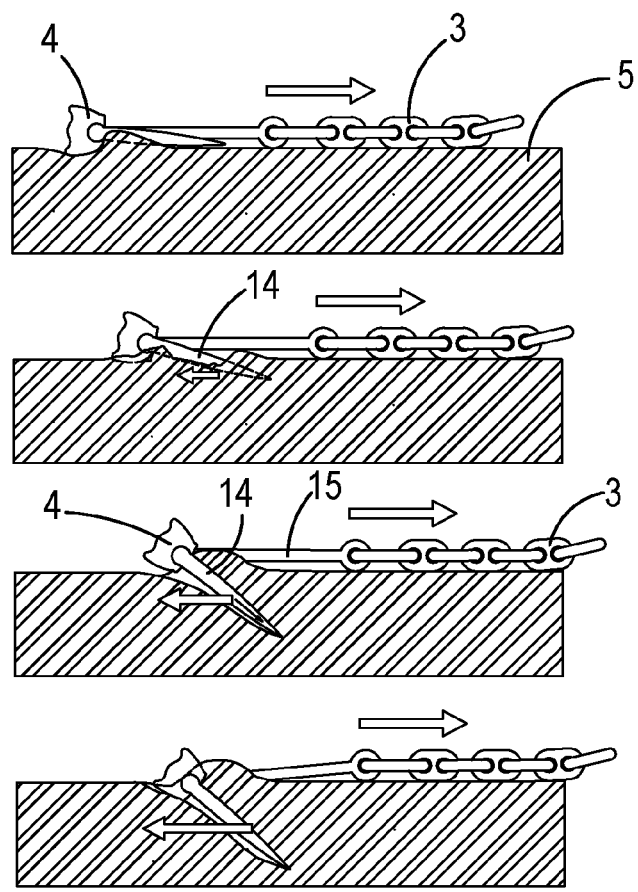
FIG. 2 illustrates the action of a stockless anchor being set.

FIG. 2 illustrates the action of a stockless anchor being set. Referring to FIG. 2, the anchor 4 is initially dragged by the rode (chain) 3 an unpredictable distance along the seabed 5 as shown in the first image. At a certain point the anchor fluke 14 starts to dig into the seabed as shown in the second image. The anchor fluke 14 then rotates relative to the shank 15 as it digs in and the anchor sets, as shown in the third and fourth images.

To monitor the safe embedment of an anchor in the water bed requires knowledge of how the anchor is set, its orientation relative to the water bed and how that changes with time and conditions. In calm conditions the anchor and rode are under no load and the boat is safe. When wind strength, waves and current increase the anchoring system is placed under tension and the unknown interface between anchor and the water bed is all that holds the boat safely in place, but this can also fail with no warning placing the boat and occupants in danger with no warning.

As a result of field testing and experimentation carried out by the present applicant, it has been discovered that two factors can be measured to quantify how well an anchor is set and when it is at risk of being dislodged from the water bed.

Firstly, it has been found that measurement of anchor velocity provides an indication of when the anchor has set. This is because velocity drops to zero when the anchor is set. Similarly, if the anchor starts to move at any speed, knowledge at the time of that event and the ability to monitor the change in anchor speed over time, provides information that quantifies the urgency of the situation.

Secondly, it has been found that neither velocity nor displacement are good indicators of the reliability of the anchoring. Experimentation has shown that anchoring reliability can be determined by how the anchor is imbedded in the seabed relative to the optimum setting orientation the manufacturer designed the anchor for. Modern stockless anchors have optimal holding power when the anchor fluke is substantially vertical, and/or the shank is horizontal or below.

Figure 3:
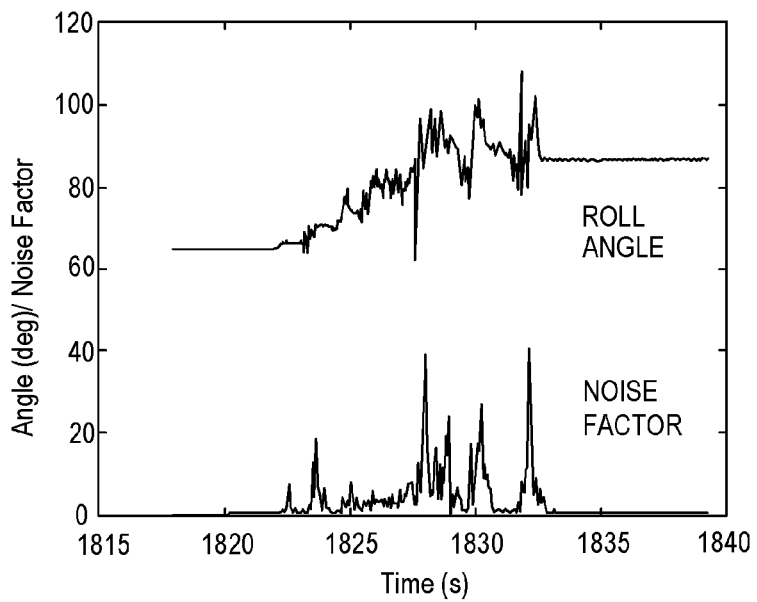
FIG. 3 is a diagram showing experimental data obtained during field trials.

FIG. 3 is a diagram showing experimental data obtained by the present applicant during field trials. In FIG. 3, the lower line shows variation of a "noise factor" with time. Here, the "noise factor" is an indication of the reliability of the setting of the anchor, calculated using an 3-axis acceleration heuristic. The upper line shows variation of anchor roll angle with time. Referring to FIG. 3, it can be seen that there is a good correlation between the roll angle and the reliability of the anchor setting. Thus, a key finding was that roll angle is a good indicator of anchor setting reliability.

It has therefore been found that measurement of anchor roll angle together with velocity can provide a) an indication of how reliably the anchor is set, and b) an indication of whether the anchor is setting or pulling out and if it is stabilizing or worsening in either case. For example, if the anchor is set, acceleration will be very high and velocity zero. If the anchor is setting in or pulling out the acceleration will be high and velocity greater than zero.

Additionally, as a means to provide an early warning of possible anchor movement before the fact, if the velocity and roll angle measurement device is mounted in a link between the anchor and the rode, the link will hang down when there is no rode force. As rode force is applied the link will rise as the rode tightens showing acceleration in the z-direction (vertical) before acceleration in the x-direction (horizontal) appears. If the captain is able to see this pre-warning he or she can let out more rode to prevent the rode force lifting the anchor. If the conditions continue to worsen he or she can monitor anchor movement and prepare to pull anchor and move the boat in a controlled manner.

Monitoring System

Figure 4:
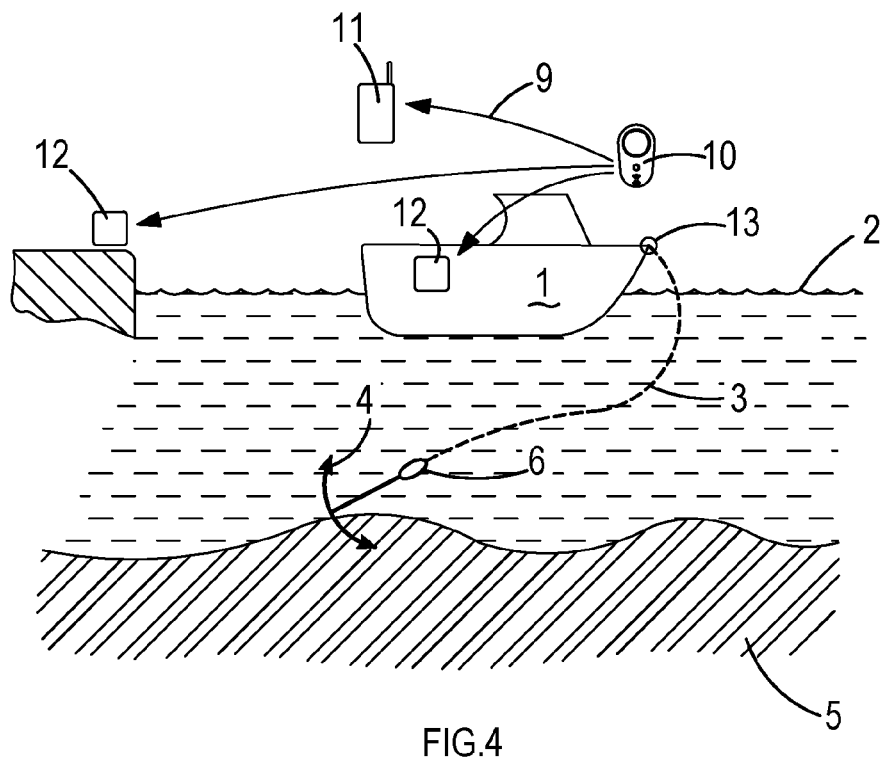
FIG. 4 shows parts of a system for determining and displaying velocity and roll angle of an anchor in accordance with an embodiment of the present invention.

FIG. 4 shows parts of a system for determining and displaying velocity and roll angle of an anchor in accordance with an embodiment of the present invention. Referring to FIG. 4, in this embodiment a boat 1 is anchored by means of an anchor 4 imbedded in a seabed 5. The anchor 4 is attached to an anchor rode 3 by means of a connecting link 6. The anchor rode 3 is further attached to boat 1 on a water surface 2 at an end remote from connecting link 6.

The connecting link 6 is used to provide the physical connection between the rode 3 and the anchor 4. In addition, the connecting link 6 comprises a measurement device which is used to obtain and transmit anchor velocity and roll angle and connecting link pitch angle. The device comprises a battery powered measurement unit which comprises a 3-axis accelerometer for producing acceleration data, an electronic microprocessor unit for processing the acceleration data and for calculating anchor velocity, roll angle and link pitch angle, and a communication unit for transmitting calculated data and optionally battery status by acoustic means via the anchor chain to a receiver on the boat.

The pickup unit 13 is magnetically attached to the anchor chain 3 near the bow roller or to the bow roller. The pickup unit 13 comprises a sensor (acoustic transducer), a demodulator and a transmission unit. The pickup unit 13 collects the acoustic signal transmitted via the chain 3 and converts it to an electrical signal, demodulates the signal, and transmits the demodulated signal to the receiver unit 10 either wirelessly or by cable.

Receiver unit 10 is a battery powered unit located on the boat 1. Receiver unit 10 comprises a communication unit configured to receive calculated data by cable or wirelessly from pickup unit 13 and has an audio/visual display that displays the calculated data received from the connecting link 6. Receiver unit 10 also comprises an electronic microprocessor that determines when anchor velocity exceeds a predetermined limit after which it sends an alarm initiation signal to alarm units 12 located in water vessel 1 or at a location nearby or on land. Receiver 10 has a SIM card enabling an alarm message to be contemporaneously sent to a mobile telephone 11 by SMS means. Similarly, in the alternative circumstance when the anchor velocity returns to below a predetermined limit, the microprocessor determines this and sends a corresponding alarm disable signal to alarm units 12, and sends an alarm cancelled message to a mobile telephone 11 by SMS means.

A portable alarm unit 12 receives alarm signals from the receiver unit 10 when a predetermined anchor velocity threshold is exceeded and upon receiving an alarm initiation signal initiates its audible and visible alarm output; and upon receiving an alarm disable signal from receiver unit 10 cancels the audio and visual alarm.

A SIM card unit in receiver unit 10 receives alarm messages from the electronic microprocessor when a predetermined anchor velocity threshold is exceeded and sends messages reporting the anchor angle and the anchor velocity to a nominated mobile phone 11 by SMS means.

In a preferred embodiment, the mechanical link 6 between the anchor 4 and the anchor rode 3 is tightly connected to the anchor 4 to ensure that they will remain in physical contact to allow for exact determination of the acceleration and therefore velocity and roll angle of the anchor. The link 6 is constrained by a joint to move with the anchor 4 laterally in the y-axis but free to rotate vertically in the x-z plane relative to the anchor shank. The preferred embodiment of such a joint is a clevis mechanism with a single bolt fixing it to the anchor head.

In another embodiment, the mechanical link 6 may be directly and tightly fixed to the anchor 4 at a position other than between the anchor and the anchor rode.

Connecting Link

Figure 5:
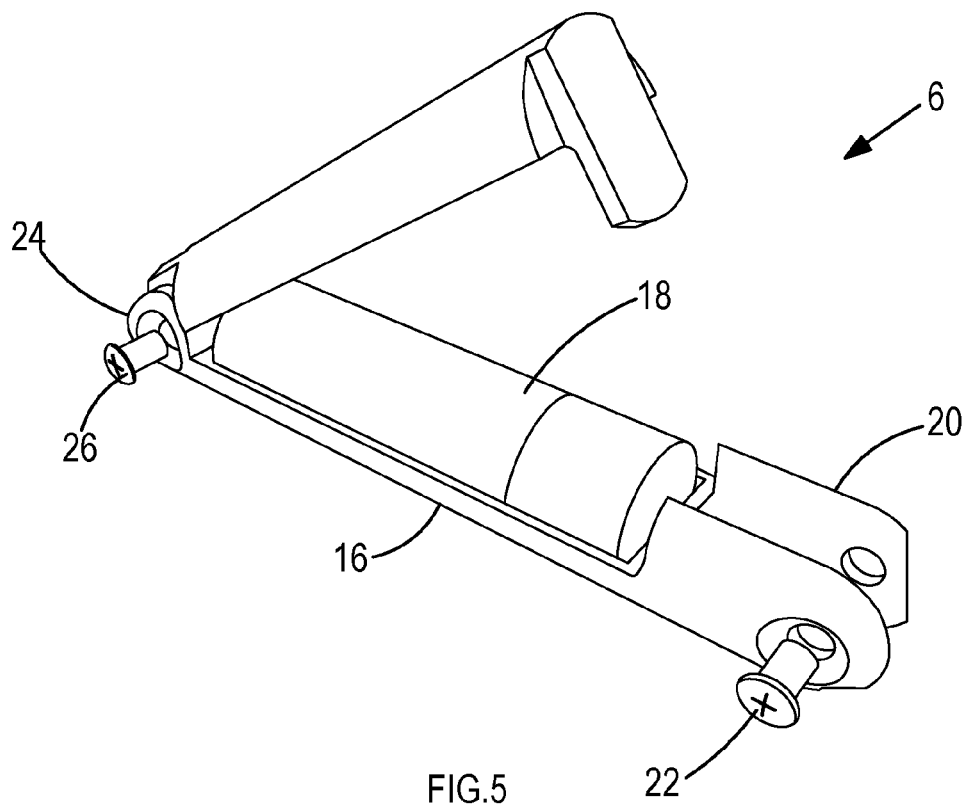
FIG. 5 shows parts of a connecting link in one embodiment of the invention.

FIG. 5 shows parts of a connecting link in an embodiment of the invention. Referring to FIG. 5, the connecting link 6 comprises a main body 16 which provides a physical connection between the anchor and the rode. The main body 16 comprises a clevis joint 20 and a bolt or pin 22 at one end for connecting the link 6 to the anchor head. At the other end, a joint 24 and bolt or pin 26 are used to connect the link 6 to the anchor rode. The main body 16 may be constructed from any suitable material such as a metal, for example, stainless steel or brass.

The main body 16 is also arranged to house a measurement device 18. The main body is in two parts which can pivot with respect to each other about the joint 24 in order to open and close around the device 18 to facilitate changing the battery. In FIG. 5, the main body is shown in its open state in which access can be gained to the device 18.

The measurement device 18 is battery powered and is enclosed in a waterproof casing. The device 18 comprises a 3-axis accelerometer for producing acceleration data, an electronic microprocessor unit for processing the acceleration data and for calculating anchor velocity, roll angle and link pitch angle, and a communication unit for transmitting calculated data and battery status by acoustic means via the anchor chain to a receiver on the boat.

Figure 6:
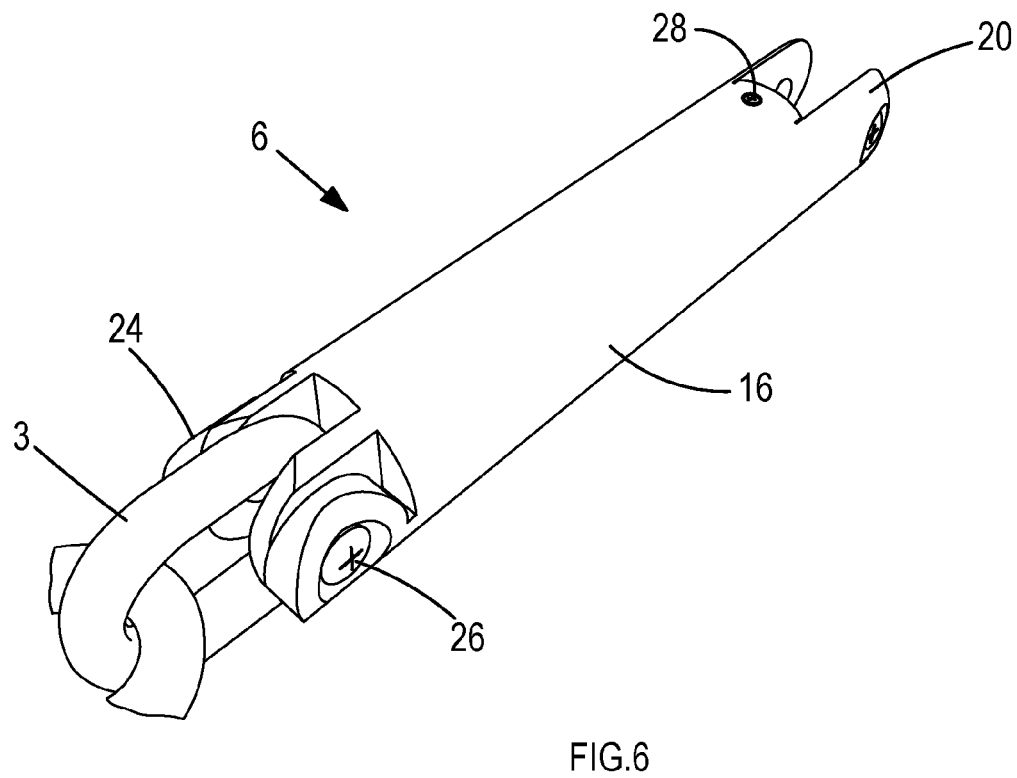
FIG. 6 shows the connecting link in its closed state.

FIG. 6 shows the connecting link 6 in its closed state, in which the two parts of the main body 16 are closed around the device 18. In this state, a screw 28 is used to hold the two parts of the main body together. Also shown in FIG. 6 is part of an anchor chain 3 which is connected to the link 6 by means of the joint 24 and the bolt 26.

Figure 7:
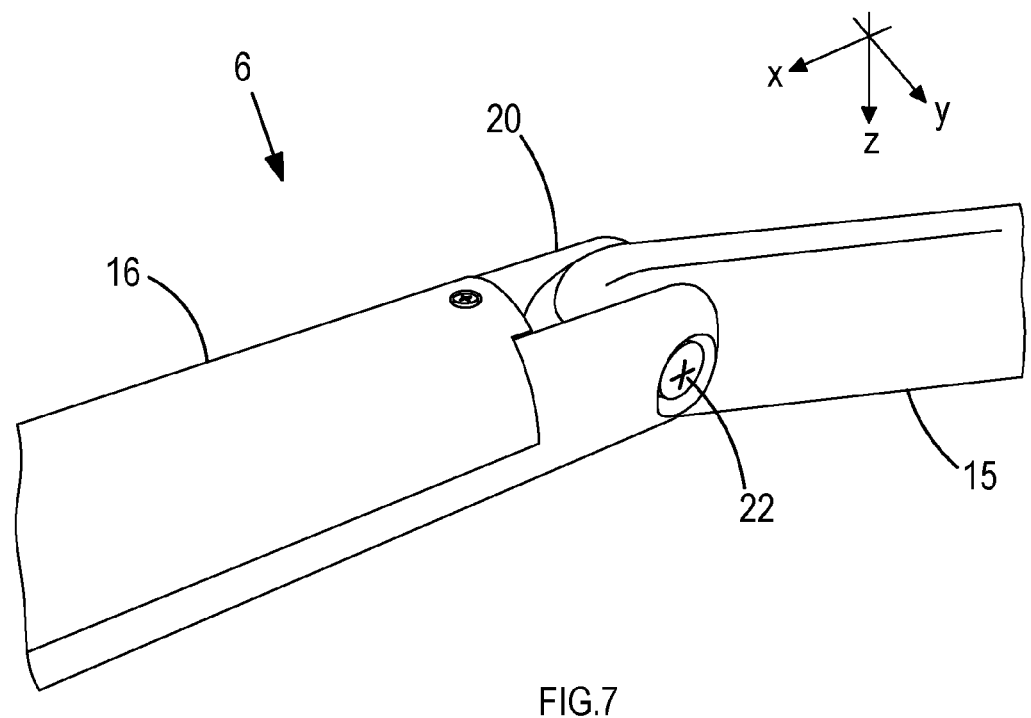
FIG. 7 shows part of the connecting link connected to the shank of an anchor.

FIG. 7 shows part of the connecting link connected to the shank of an anchor. Referring to FIG. 7, the main body 16 of the connecting link 6 is connected to the shank 15 of an anchor by means of the clevis joint 20 and a bolt or pin 22. The clevis joint 20 allows the connecting link 6 to rotate freely with respect to the anchor shank 15 in the x-z plane. However, the connecting link 6 is constrained by the clevis joint 20 such that it rotates with the anchor shank 15 in the y-z plane.

Figure 8:
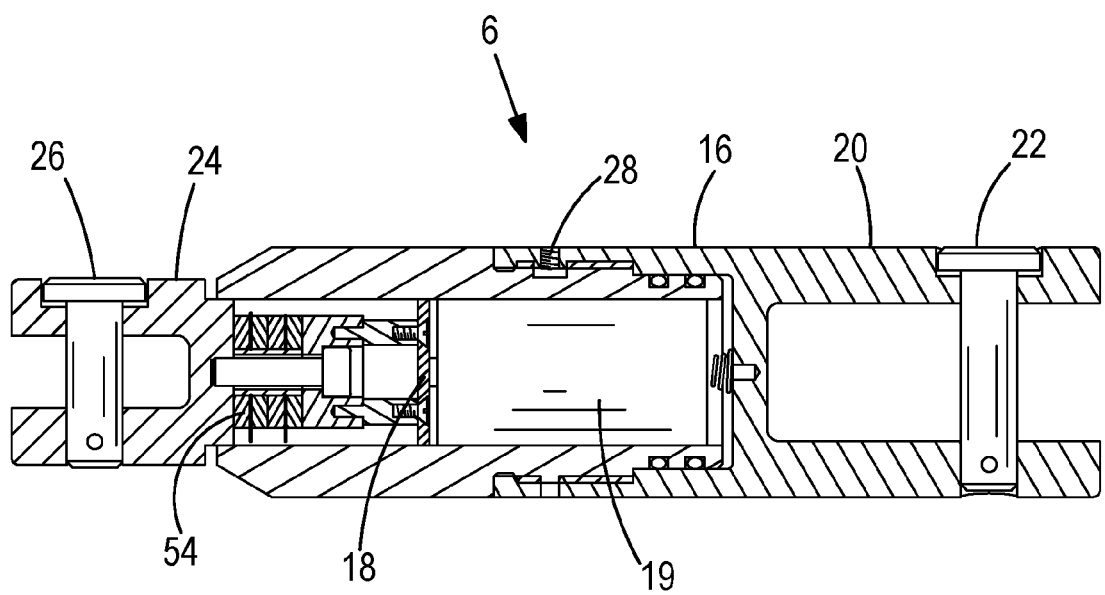
FIG. 8 shows parts of a connecting link in another embodiment of the invention.

FIG. 8 shows parts of a connecting link in another embodiment of the invention. Referring to FIG. 8, the connecting link 6 comprises a main body 16 in two parts which provides a physical connection between the anchor and the chain. The main body 16 comprises a clevis joint 20 and a bolt or pin 22 at one end for connecting the link 6 to the anchor head. At the other end, a joint 24 and bolt or pin 26 are used to connect the link 6 to the rode.

The main body 16 is also arranged to house a measurement device 18 and a battery 19. The main body is in two parts which can be screwed together in order to open and close to facilitate changing the battery. In its closed state, the two parts of the main body 16 are screwed together around the device 18 and battery 19. The measurement device 18 and battery 19 are then enclosed in the connecting link which forms a waterproof casing. In this state, a screw 28 is used to prevent the two parts of the main body from unscrewing.

Measurement Device

Figure 9:
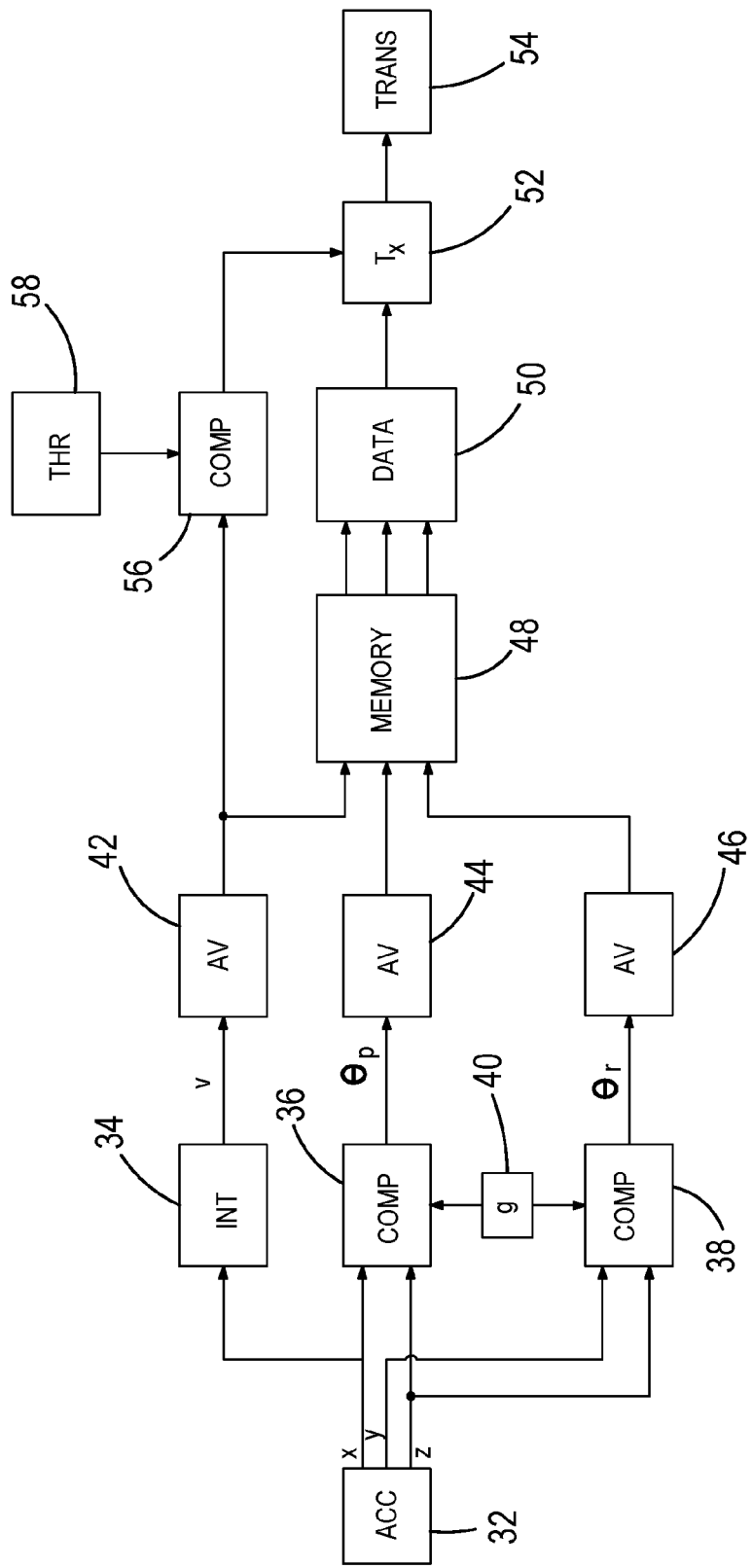
FIG. 9 shows parts of a measurement device used to obtain and transmit anchor velocity and roll angle.

FIG. 9 shows parts of the measurement device 18 which is used to obtain and transmit anchor velocity and roll angle. Referring to FIG. 9, the device comprises 3-axis accelerometer 32, integrating module 34, x- and z-axis comparison module 36, y- and z-axis comparison module 38, gravity vector module 40, averaging modules 42, 44, 46, memory 48, data packaging module 50, transmission module 52, transducer 54, comparison module 56 and threshold module 58. Some or all of the modules may be implemented as software routines running on an electronic microprocessor unit with associated memory, and/or as firmware or hardware, as appropriate.

In operation, the accelerometer 32 measures acceleration in three orthogonal directions (x, y and z) to produce raw, 3-dimensional acceleration data a. In this embodiment the acceleration is sampled at a frequency of 200 Hz to produce digital outputs at 5 ms intervals, although other values could be used instead. The x-component of the acceleration data is fed to the integrating module 34, which is used to calculate velocity data v as will be explained below. The x- and z-components of the acceleration data are fed to comparator module 36, which is used to calculate link pitch angle $\theta_p$. The y- and z-components of the acceleration data are fed to the comparator module 38, which is used to calculate anchor roll angle $\theta_r$. The averaging modules 42, 44, 46 each performs a 200-point moving average calculation on one of the three respective calculated data sets and writes the averaged data into memory 48. The data packaging module 50 reads the averaged data from the memory 48, together with any other appropriate parameters, and packages the data into a data set. The data set comprises a unique anchor ID, average velocity, average roll angle, average link pitch angle, and optionally other diagnostic data such as battery status. The transmission module 52 modulates the data set onto a carrier frequency to produce a modulated signal. The modulated signal is converted to an acoustic signal by the transducer 54 and transmitted acoustically to the signal pickup unit 13 on the boat.

The average velocity data are also fed to comparison module 56. The comparison module 56 compares the average velocity data to thresholds stored in threshold module 58 to determine the time intervals at which the data set should be transmitted. In one embodiment, if the velocity is above a threshold, the transmission module 52 transmits the current data set at 1, 2, 3 or 5 second intervals, although other values greater or less than any of these values may be used instead. If velocity is below the threshold, the transmission module 52 transmits the data set at 10, 20 or 30 second intervals, however other values either greater than or less than any of these values may be used instead. The threshold may be close to zero (including an error factor to take into account any noise) so that data is transmitted at 1, 2, 3 or 5 second intervals as soon as there is determined to be any movement of the anchor. Of course, other values of the threshold and the intervals may be used instead.

Although not shown in FIG. 9, the time intervals at which the data are transmitted may also be varied in dependence on the value of the link pitch angle. For example, if the link pitch angle approaches horizontal, indicating that the chain is under tension, then the data may be transmitted more frequently than if the link pitch angle indicates that the chain is hanging at rest.

Calculating Anchor Velocity

Experimentation has shown that the anchor will not normally move without force being applied by the rode. Therefore, in order for the anchor to move, the rode must be in tension and therefore the link between the anchor and the rode must be lying predominantly in the x-direction of translation. As a consequence, it has been found that a meaningful measure of velocity can be calculated from the x-axis data alone, and correction for link pitch angle results in no significant improvement in calculation of velocity. For this reason, in the present embodiment, the x-axis acceleration data alone is used to calculate velocity data. However, if desired, y and z components of the acceleration data could be used as well or instead.

Referring again to FIG. 9, the integrating module 34 receives the x-component of the acceleration data from the accelerometer 32. The integrating module 34 integrates the x-axis acceleration data once with respect to time, in order to obtain velocity data v. The equation of motion in this instance is $$v = v_0 + a_x \cdot t$$

where v is the current value of velocity, $v_0$ is the previous value of velocity, $a_x$ is the x-component of the acceleration data, and t is incremental time.

The accelerometer 32 measures acceleration at small time intervals in the order of 5 ms with a 200 Hz sampling rate. After each time interval the integrating module 34 calculates the product $a_x \cdot t$. Since the timesteps are small, $v_0$ may be assumed to be the previously calculated value of v, so addition of the current values of $v_0$ and $a_x \cdot t$ will accurately yield current velocity v. The current velocity v is then fed to averaging module 42, where it is averaged over time and then stored in memory 48.

Calculating Roll Angle

Experimentation has shown that there is an excellent correlation between anchor roll angle and a 'noise factor' calculated using an 3-axis acceleration heuristic (see discussion above with reference to FIG. 3). The connecting link 6 is 'keyed' to the anchor shank 15 by means of the clevis joint 20 so that the connecting link lies at the same roll angle as the anchor. Therefore, in the present embodiment, the anchor roll angle is calculated relative to vertical by comparing z- and y-axis acceleration data with the gravity vector. Vertical is deemed to be zero degrees for the purposes of displaying roll angle which will then be plus or minus an angle up to 180 degrees from vertical.

Referring to FIG. 9, the comparison module 38 receives the y- and z-components of the acceleration data from the accelerometer 32. The comparison module 38 then compares these components with the corresponding components of the gravity vector g which is stored in the gravity vector module 40. The gravity vector g is the acceleration due to gravity which is experienced by the device 18 when it is in a particular orientation, and is pre-stored in the device.

The anchor roll angle can then be calculated using the equation $$\theta_r = \tan^{-1}\frac{g_y - a_y}{g_z - a_z}$$

where $\theta_r$ is the roll angle, $g_y$ is the y-component of the gravity vector, $g_z$ is the z-component of the gravity vector, $a_y$ is the y-component of the acceleration data, and $a_z$ is the z-component of the acceleration data. The roll angle $\theta_r$ is then fed to averaging module 46, where it is averaged over time and then stored in memory 48.

Calculating Link Pitch Angle

Experimentation has shown that, as rode tension increases, the connecting link 6 rises from its hanging position at rest, approaching horizontal when sufficient tension is applied to start moving the anchor. Link pitch angle is therefore a good early warning indicator of impending anchor movement. Therefore, in embodiments of the invention, the link pitch angle relative to horizontal is measured and transmitted to the surface.

The connecting link 6 is 'keyed' to the anchor shank 15 and will lie at the same roll angle as the anchor but can rotate freely in the x-z plane relative to the anchor shank. If the anchor is lying on its side, it is not set. Therefore, in this case, a rising link pitch angle will provide no meaningful early warning of anchor movement because little force is required to move the anchor on its side. However, if the anchor is substantially vertical and set well, measurement of the link pitch angle relative to horizontal is meaningful. Link pitch angle may be an angle between 90 degrees (hanging at rest) and around zero degrees (horizontal in tension).

Referring to FIG. 9, the comparison module 36 receives the x- and z-components of the acceleration data from the accelerometer 32. The comparison module 36 then compares these components with the corresponding components of the gravity vector g which is stored in the gravity vector module 40. The link pitch angle can then be calculated using the equation $$\theta_p = \tan^{-1}\frac{g_z - a_z}{g_x - a_x}$$

where $\theta_p$ is the link pitch angle, $g_z$ is the z-component of the gravity vector, $g_x$ is the x-component of the gravity vector, $a_z$ is the z-component of the acceleration data, and $a_x$ is the x-component of the acceleration data. The link pitch angle $\theta_p$ is then fed to averaging module 44, where it is averaged over time and then stored in memory 48.

Acoustic Data Transmission Across a Chain

In order to make the processed data set available to an operator, it is necessary to transmit it from the seabed to the water surface. Typically, data transmission through a body of water is achieved either by using a dedicated cable, or by transmitting acoustic waves through the water. However, experiments carried out by the present applicant have shown that acoustic data transmission across a chain can provide a viable and cost-effective alternative.

Acoustic data transmission across relatively continuous cross-section and consistent mass per unit length structures such as pipes and wires are well-researched and proven methods. Signal strength, losses and methods for improving signal to noise ratio are well understood and widely used in industry. However, a chain is a discontinuous medium when not in tension, an unpredictably connected medium when under light load, and an unknown connectivity structure when under load. Therefore attempts to transmit data acoustically across a chain have not previously been pursued because of the assumed inherent unreliability.

When monitoring an anchor for safe holding, data is not required when the anchor chain is slack as holding force is practically provided by chain friction on the seabed. When wind and current are such that the chain comes under tension, data on the status of the anchor is required. When the forces imposed on the anchoring system exceeded chain friction on the seabed, the coupling between anchor and chain comes under tension and it will rise towards a horizontal orientation. If the forces continue to rise above the holding force of the anchor in the seabed, the anchor will move and possibly release from the seabed.

The realization that data is required only when the anchor chain is in tension provided the stimulus to research and experiment with data transmission across the chain at a range of tensions from no tension to a tension at which acoustic signals were reliably received across the entire length of a 40 m, 8 mm link test chain. Experimentation showed that a very low chain tension, in the order of tens of kilograms force even with the chain lying in a tortuous manner will create a sufficient acoustic coupling between links to allow effective acoustic data transmission between an anchor on the seabed and a receiver placed on the bow roller of a boat to allow monitoring of the anchor state when required. Data transmission was effective at frequencies below typical sonar communication frequencies of 50-300 kHz. An optimal transmission frequency range to facilitate a high data transfer speed was established to be in the 2-12 kHz range, although transmission was also possible outside of this range.

Referring again to FIG. 9, the transmission module 52 comprises a modem that modulates a carrier frequency in the 2-12 kHz range with the data set from the module 50 to produce a modulated signal. The modulated signal is supplied to the transducer 54, which converts the modulated signal into an acoustic signal. The transducer 54 in this embodiment is a piezo-electric element that is mechanically and acoustically coupled to the main body 16 of the connecting link 6, preferably in the vicinity of the joint 24. The transducer 54 transmits the acoustic signal to the receiver on the boat by means of vibration through the chain 3.

As discussed above, the time intervals at which the data set is transmitted are varied in dependence on the value of the velocity data and/or the link pitch angle data. As soon as there is determined to be any movement of the anchor, the data set is transmitted at more frequent intervals (for example, 1, 2, 3 or 5 second intervals). This situation is likely to correspond to the chain being in tension, when reliable acoustic coupling between links can be achieved. Furthermore, any failure of the anchor setting is likely to be accompanied by the chain being in tension, since such failure is usually caused by the chain pulling on the anchor. Therefore, the data set can be reliably sent to the receiver unit at the surface at a relatively high data rate at those times when there is most risk of failure of the anchor setting and when the data is most needed.

Receiver Unit

Referring back to FIG. 4, the pickup unit 13 comprises a piezo-electric acoustic pickup attached to the chain at the bow-roller or attached to the bow roller by magnet to receive the acoustic signal. The pickup unit also comprises an acoustic modem inbuilt to decode the data set and a transmitter unit to send the calculated data set to receiver unit 10. The pickup unit 13 is battery powered and is enclosed in a ruggedized housing.

The receiver unit 10 on the boat is a battery powered handheld device connected by a cable or wirelessly connected to the piezo-electric acoustic pickup unit 13. The receiver unit 10 receives the data set from the pickup unit and displays the data on a display. The receiver unit 10 also has an RF transmitter that can send and cancel alarms to an alarm pods 12 within radio range of the boat, and a GSM transmitter 9 that can send an SMS alarm and all-safe messages to nominated mobile phones 11.

Figures 10, 11:
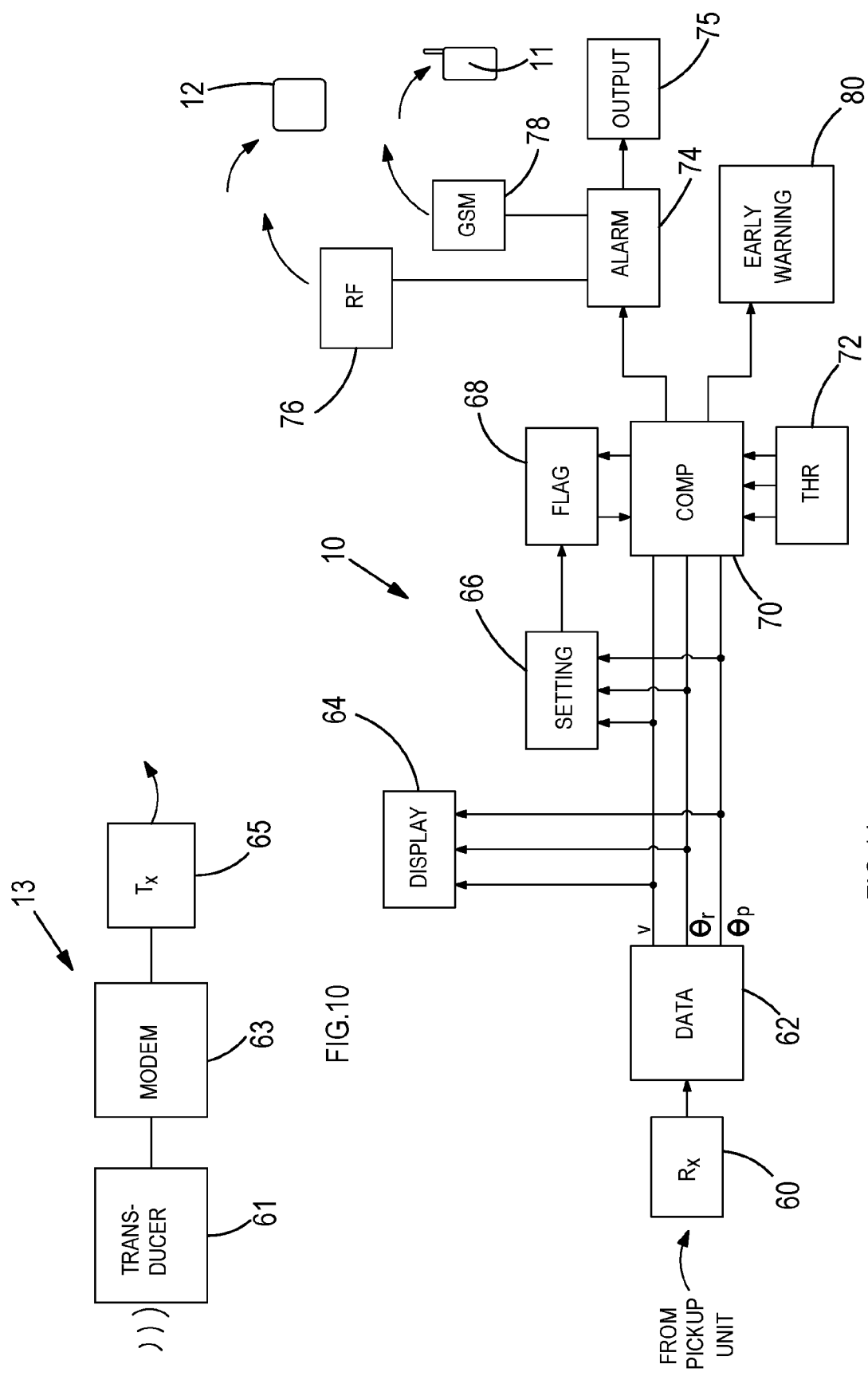
FIG. 10 shows parts of a pickup unit in an embodiment of the invention.
FIG. 11 shows parts of a receiver unit in an embodiment of the invention.

FIG. 10 shows parts of the pickup unit 13 in an embodiment of the invention. Referring to FIG. 10, the pickup unit comprises an acoustic transducer 61 which in this example is a piezo-electric pickup, modem 63, and transmission module 65. In operation, the pickup 61 receives acoustic signals transmitted by the connecting link 6 through the chain 3 and converts them into electrical signals. The modem 63 demodulates the electrical signal to obtain the current data set. The transmission module 65 transmits the data set either wirelessly or via a cable to the receiver unit 10. For example, the data set may be transmitted using a wireless protocol such as Bluetooth or Wi-Fi (IEEE 802.11), or any other appropriate protocol.

FIG. 11 shows parts of the receiver unit 10 in an embodiment of the invention. Referring to FIG. 11, the receiver unit comprises a receiver unit 60, data extraction module 62, display unit 64, anchor setting determination module 66, setting flag module 68, comparison module 70, threshold module 72, alarm generating module 74, output device 75, wireless or RF transmitter 76 and cellular transmitter 78. Some or all of the modules may be implemented as software routines running on an electronic microprocessor unit with associated memory, and/or as firmware or hardware, as appropriate. The receiver unit 10 may be implemented as a single physical piece of apparatus, or its functions may be distributed across two or more different pieces of apparatus. In one embodiment, the receiver unit 10 may be implemented as software running on a mobile processing device such as a mobile telephone.

In operation, the receiver module 60 receives the current data set transmitted from the pickup unit 13 and passes it to the data extraction module 62. The data extraction module 62 extracts the values of the velocity v, anchor roll angle $\theta_r$, link pitch angle $\theta_p$, anchor ID, and any other parameters such as battery status, from the data set. The values of velocity, anchor roll angle and link pitch angle are displayed on the display 64. The displayed values can be used by an operator to determine whether the anchor has set, and to monitor its movement.

If two or more anchors are being used, then a separate pickup unit 13 and data extraction module 62 may be provided for each anchor. In this case, a plurality of data sets will be received, one from each anchor. The data extraction module 62 extracts the anchor ID from each transmitted data set, so that the unit knows which anchor the data set is associated with. The values from each anchor may be displayed simultaneously or alternately on the display 64.

The velocity v, anchor roll angle $\theta_r$, and link pitch angle $\theta_p$ are also provided to the anchor setting determination module 66. The setting determination module 66 compares the velocity data to predetermined patterns of velocity data which are known to correspond to the setting of an anchor. In particular, when an anchor is setting, the velocity is usually characterized by a period in which the velocity is greater than zero, followed by a period in which the velocity decreases rapidly to zero. If such a pattern of velocity data is also accompanied by the anchor roll angle $\theta_r$ indicating that the anchor fluke is orientated at or close to vertical (for example, within 10 or 20 degrees of vertical), then it can be determined with a reasonable degree of certainty that the anchor has set.

Furthermore, it may be assumed that the anchor is moving through the seabed if the anchor rode is taut and the anchor velocity is greater than zero. It may also be assumed that the anchor is set when the anchor rode is under tension and the anchor velocity is zero. Thus, the link pitch angle $\theta_p$ may also be used in determining whether or not the anchor is set. In particular, if the link pitch angle is at or close to horizontal, indicating that the rode is under tension, and the velocity is zero, then this either alone or in combination with the other factors discussed above may be used to determine that the anchor has set.

When the setting determination module 66 determines that the anchor has set, it outputs a signal indicating this condition to the setting flag module 68. The setting flag module 68 sets a flag indicating that the anchor has been determined to have set. This indication is provided to the comparison module 70 and may also be displayed on the display 64.

The velocity v and anchor roll angle $\theta_r$ are also provided to the comparison module 70. The comparison module 70 compares the current values of the velocity and the anchor roll angle to preset thresholds stored in the threshold module 72. If either or both of the thresholds are exceeded, and the set flag module 68 indicates that the anchor is determined to be set, then the comparison module outputs a signal to the alarm generating module 74. For example, if the velocity value rises above a noise threshold, or if the anchor roll angle deviates from the vertical by more than a certain amount, then the comparison module outputs a signal to the alarm generating module 74. In this situation, a signal is also output to the set flag module 68 to clear the flag indicating that the anchor has been determined to have set.

When the alarm generating module 74 receives the signal from the comparison module 70 indicating that the thresholds have been exceeded, it causes the output device 75 to produce an audible and/or visual alarm to alert the captain that the anchor may be coming loose. In addition, the alarm generating module 74 sends a signal to the wireless or RF transmitter 76 that can send and cancel alarms to portable alarm unit 12 within radio range of the boat. The alarm generating module 74 also sends a signal to cellular transmitter 78 that can send an SMS alarm and all-safe messages to nominated mobile phones 11. Alarm signals may also be displayed on the display 64.

If, following an alarm, the setting determination module 66 determines that the anchor has re-set, and the comparison module 70 determines that the thresholds stored in the threshold module 72 are no longer exceeded, then the comparison module 70 indicates this new situation to the alarm generating module 74. In response, the alarm generating module 74 stops producing an alarm on the output device 75. The alarm generating module 74 also sends an alarm cancel signal to the RF transmitter 76 and the cellular transmitter 78, which cancel the alarms sent to their respect devices.

In the arrangement of FIG. 11, the link pitch angle $\theta_p$ is also fed to comparison module 70. The comparison module 70 compares the current value of the link pitch angle to a preset threshold value stored in the threshold module 72. The threshold value is set to be a certain angle from the horizontal (for example 20° or 10° from the horizontal). If the threshold is exceeded (indicating that the link is approaching horizontal), and the setting flag module 68 indicates that the anchor is set, then the comparison module outputs a signal to early warning indicator 80. The early warning indicator 80 may produce an audible and/or visual early warning indicator and may also display an early warning indicator on the display 64. If the operator sees this early warning indicator, they can let out more rode to prevent the rode force lifting the anchor. If the conditions continue to worsen they can monitor anchor movement and prepare to pull anchor and move the boat in a controlled manner.

Figure 12:
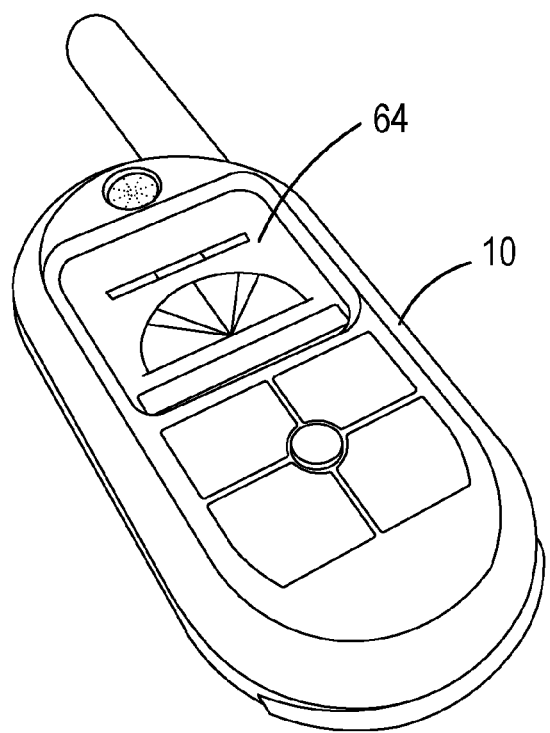
FIG. 12 shows an example of a receiver unit.

FIG. 12 shows an example of a receiver unit 10. The receiver includes a display 64 which in this example displays the current anchor speed and anchor roll angle. In this example the anchor speed and the anchor roll angle are both indicated against backgrounds having regions of green, yellow and red, indicating degree of anchor safety. The receiver unit 10 may also output audio and/or visual alarms. In addition, the receiver unit 10 may indicate the status of the battery in the measuring unit 18. If two or more anchors are being used, the receiver unit 10 may switch the display 84 between the different anchors.

Figure 13:
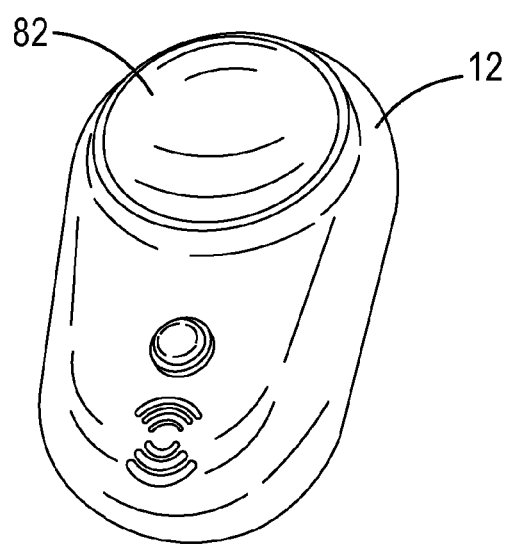
FIG. 13 shows an example of a portable alarm unit.

FIG. 13 shows an example of a portable alarm unit 12. The unit includes a warning light 82 and an acoustic transducer which allow the device to output visual and audible warnings of anchor movement.

Acoustic Data Transmission Through Water

Figure 14:
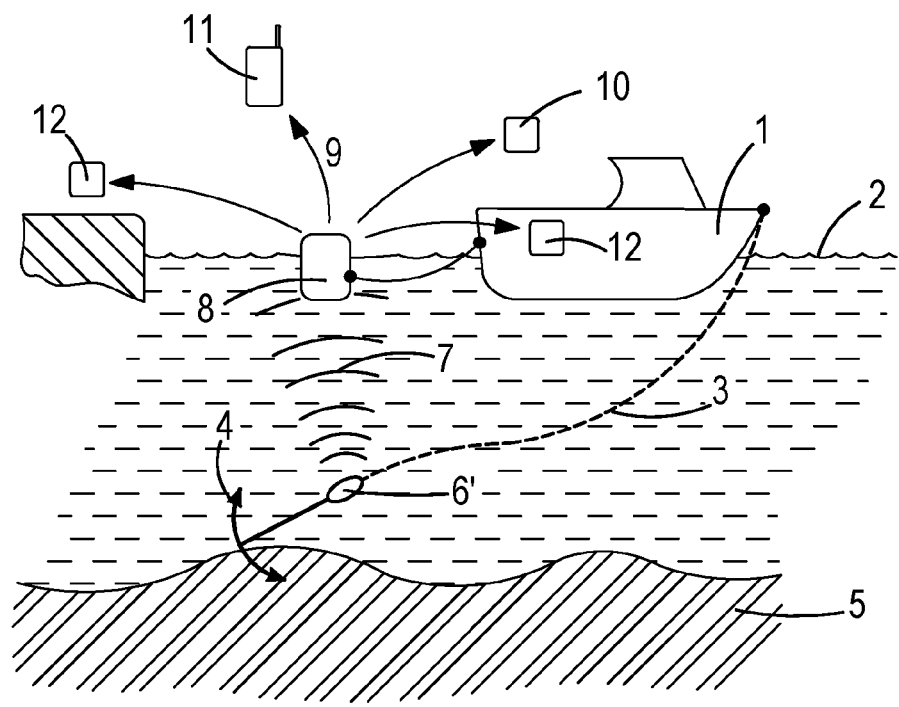
FIG. 14 shows parts of a system for determining and displaying velocity and roll angle of an anchor in another embodiment of the invention.

FIG. 14 shows parts of a system for determining and displaying velocity and roll angle of an anchor in accordance with another embodiment of the invention. Referring to FIG. 14, in this embodiment a boat 1 is anchored by means of an anchor 4 imbedded in a seabed 5. The anchor 4 is attached to an anchor rode 3 by means of a connecting link 6'. The anchor rode 3 is further attached to boat 1 on a water surface 2 at an end remote from connecting link 6'. The connecting link 6' is used to provide the physical connection between the rode 3 and the anchor 4. As in the previous embodiment, the connecting link 6' comprises a measurement device which is used to obtain and transmit anchor velocity and roll angle to the water surface. However, in this embodiment, a transmitter in the connecting link 6' sends the calculated data by sonar means through the water to a receiver in a float 8 at the water surface.

The float 8 sits half submerged in water, with a sonar receiver below the surface and a RF transmitter above the surface. The float 8 comprises a processing unit which may include some or all of the processing modules of the receiver unit 10 described above and shown in FIG. 11. The processing unit in the float receives the calculated data from the connecting link 6' and routes the data to the RF transmitter. The RF transmitter sends the data by radio waves through the air to the receiver unit 10. The receiver unit 10 displays the velocity data, anchor pitch angle data and/or link pitch angle data on its display. The processing unit also produces alarm signals and sends the alarm signals by radio waves through the air to portable alarm units 12. A cellular transmitter may send SMS alarm signals and all-safe messages to nominated mobile phones 11 on a GSM network 9.

In an alternative embodiment, the sonar receiver is in a device attached to or suspended from the boat below the water surface. In this case the RF transmission link may be replaced by a wired transmission link.

A method and system for monitoring the reliability of setting of a water vessel's anchor has been described. The system comprises a measurement device fitted in a link between an anchor and anchor rode that measures 3-axis acceleration of the anchor, a microprocessor that calculates velocity and roll-angle of an anchor from the acceleration data, and a transmitter that sends the calculated data by acoustic vibration means across the anchor chain to a hand held receiver on the water vessel, which displays the calculated data, and in the case that the calculated data exceeds set values, relays an alarm actuation signal to a portable alarm to initiate a visible and audible alarm, and to send an SMS alarm message to a mobile telephone by GSM network.

Preferred embodiments of the invention provide means for continual observation of the reliability of an anchoring by continually measuring 3-axis acceleration of an anchor, continually calculating velocity and roll angle of an anchor, and continually displaying this data on a handheld audio-visual device onboard or near the water vessel. Preferred embodiments also provide means for triggering an alarm on an alarm device onboard or near the floating vessel if predetermined anchor movement thresholds are exceeded, and for contemporaneously sending an SMS alarm message to a mobile phone if predetermined anchor movement thresholds are exceeded.

A preferred method embodiment comprises the steps of measuring anchor acceleration values in 3 axes in particular as a function of time; integrating the acceleration values in the x-axis or direction of the rode once over time, preferably by means of numerical integration to calculate anchor velocity; and estimating anchor roll angle by calculating the difference between the vertical z-axis and horizontal y-axis acceleration vectors and the gravitational vector.

A preferred system embodiment comprises two battery-powered devices, each independently powered by a battery, namely:

1. A mechanical link between the anchor and the anchor rode housing a 3-axis acceleration sensor; a battery; a microprocessor that receives the raw acceleration data from the sensor and calculates velocity, roll angle of the anchor and link pitch angle; and an acoustic transmitter that transmits the calculated data by vibration means across the anchor chain to a receiver on the boat.

2. An electronic receiving device in hand-set form comprising an acoustic pickup that receives the calculated data from the chain; a battery; an audio-visual display device that displays the calculated data, a microprocessor that analyses the calculated data and that generates an alarm initiation signal if a predetermined anchor velocity threshold is exceeded; a radio wave transmitter that transmits the calculated data and alarm initiation signals through air to alarm pods; a SIM card GSM network SMS message generator that sends an alarm message to a mobile telephone by SMS means via a GSM or satellite telephone network.

It will be appreciated that embodiments of the invention have been described above by way of example only, and modifications will be apparent to the skilled person. For example, features of one embodiment may be used with any other embodiment. Other variations may be made within the scope of the claims.

The invention claimed is:

1. A device arranged to monitor an anchor for anchoring a water vessel, the device comprising:
    an accelerometer arranged to measure acceleration of the device to yield acceleration data;
    a processor arranged to:
        process the acceleration data to yield roll angle data, the roll angle data indicating a roll angle of the anchor; and
        process the acceleration data to yield velocity data; and
    a transmitter arranged to transmit the roll angle data and the velocity data from the device to a receiver unit for use with the water vessel.

2. A device according to claim 1, wherein the accelerometer is a 3-axis accelerometer arranged to produce acceleration data with three orthogonal components.

3. A device according to claim 2, wherein the velocity data is obtained by integrating a component of the acceleration data with respect to time.

4. A device according to claim 2, further comprising a memory which stores a gravity vector, wherein the roll angle data is produced by comparing two components of the acceleration data with the gravity vector.

5. A device according to claim 1, wherein the processor is arranged to process the acceleration data to yield pitch angle data, the pitch angle data indicating a pitch angle of the device, and the transmitter is arranged to transmit the pitch angle data from the device to the receiver unit.

6. A device according to claim 1, wherein the processor is arranged to average at least one of the roll angle data, the velocity data, or pitch angle data with respect to time to yield average values, and the device further comprises a memory arranged to store the average values of the at least one of the roll angle data, the velocity data, or the pitch angle data.

7. A device according to claim 6, wherein the processor is arranged to package the average values of the at least one of the roll angle data, the velocity data, or the pitch angle data into a data set, and the transmitter is arranged to transmit the data set from the device to the receiver unit.

8. A device according to claim 7, wherein the data set includes an identification of the anchor.

9. A device according to claim 1, wherein the transmitter is arranged to vary time intervals at which data are transmitted from the device in dependence on at least one of the velocity data or pitch angle data.

10. A device according to claim 1, wherein the transmitter is an acoustic transmitter arranged to transmit an acoustic signal through a rode or through water.

11. A device according to claim 1, wherein the device is a connecting link for connecting the anchor to a rode.

12. A device according to claim 11, wherein the connecting link is connected to the anchor by means of a joint which constrains rotation of the connecting link relative to the anchor in at least one plane.

13. A receiver unit adapted for use with a water vessel connected to an anchor, the receiver unit comprising:
    a receiver arranged to receive anchor roll angle data indicating a roll angle of the anchor and anchor velocity data indicating a velocity of the anchor from an underwater device; and
    a processor arranged to determine whether the anchor has set based on the anchor velocity data and the anchor roll angle data.

14. A receiver unit according to claim 13, wherein the processor is further arranged to determine whether an anchor setting has failed based on the anchor velocity data and the anchor roll angle data, the receiver unit further comprising an alarm signal generator arranged to generate an alarm signal if it is determined that the anchor setting has failed.

15. A receiver unit according to claim 13, further comprising a transmitter arranged to send at least one of an alarm signal, the anchor velocity data, the anchor roll angle data, or link pitch angle data to an external portable device.

16. A receiver unit according to claim 13, wherein the receiver unit is arranged to provide an indication of potential anchor movement based on link pitch angle data.

17. A receiver unit according to claim 13, wherein the receiver is arranged to receive an acoustic signal transmitted through a rode between the anchor and the water vessel.

18. A method of monitoring an anchor for anchoring a water vessel, the method comprising:
    measuring acceleration of a device attached to the anchor to yield acceleration data;
    processing the acceleration data to yield anchor roll angle data, the anchor roll angle data indicating a roll angle of the anchor;
    processing the acceleration data to yield anchor velocity data;
    transmitting the anchor roll angle data and the anchor velocity data from the device to a receiver unit for use with the water vessel; and
    determining whether the anchor has set based on the anchor velocity data and the anchor roll angle data.

19. A method according to claim 18, wherein the transmitting step comprises transmitting an acoustic signal through a rode between the anchor and the water vessel.

20. A method according to claim 18, further comprising determining whether an anchor setting has failed based on the anchor velocity data and the anchor roll angle data and generating an alarm signal if it is determined that the anchor setting has failed.

* * * * *